(12) United States Patent
Yan (10) Patent No.: US 10,897,362 B2
(45) Date of Patent: Jan. 19, 2021

(54) DE-DUPLICATION OF ENCRYPTED DATA

(71) Applicant: Nokia Technologies Oy, Espoo (FI)

(72) Inventor: Zheng Yan, Espoo (FI)

(73) Assignee: Nokia Technologies Oy, Espoo, FL (US)

( * ) Notice: Subject to any disclaimer, the term of this patent is extended or adjusted under 35 U.S.C. 154(b) by 92 days.

(21) Appl. No.: 15/534,658

(22) PCT Filed: Dec. 18, 2014

(86) PCT No.: PCT/CN2014/094189
§ 371 (c)(1),
(2) Date: Jun. 9, 2017

(87) PCT Pub. No.: WO2016/095152
PCT Pub. Date: Jun. 23, 2016

(65) Prior Publication Data
US 2018/0270069 A1 Sep. 20, 2018

(51) Int. Cl.
*H04L 9/32* (2006.01)
*H04L 9/08* (2006.01)
(Continued)

(52) U.S. Cl.
CPC .......... *H04L 9/3239* (2013.01); *G06F 3/0608* (2013.01); *G06F 3/0641* (2013.01);
(Continued)

(58) Field of Classification Search
CPC ... H04L 9/0825; H04L 9/3239; H04L 9/3247; H04L 9/0894; H04L 9/30; H04L 2209/76;
(Continued)

(56) References Cited

U.S. PATENT DOCUMENTS 6,098,056 A * 8/2000 Rusnak .............. G06Q 20/3821
705/75
2006/0093150 A1 5/2006 Reddy et al.
(Continued)

FOREIGN PATENT DOCUMENTS

CN 103647642 A 3/2014
CN 103731261 A 4/2014
(Continued)

OTHER PUBLICATIONS

Extended European Search Report received for corresponding European Patent Application No. 14908187.9, dated Jul. 11, 2018, 6 pages.
(Continued)

*Primary Examiner* — Brandon S Hoffman
*Assistant Examiner* — Nega Woldemariam
(74) *Attorney, Agent, or Firm* — Laine IP Oy (57) ABSTRACT

According to an example aspect of the invention, there is provided an apparatus comprising at least one processing core and at least one memory including computer program code, the at least one memory and the computer program code being configured to, with the at least one processing core, cause the apparatus at least to receive, from a first user, a ciphertext, a first hash value and a first ciphered encryption key, receive, from a second user, a second hash value, responsive to a determination the first hash value is the same as the second hash value, obtain a re-encryption key, and apply the re-encryption key to the first ciphered encryption key to obtain a re-encrypted encryption key, the re-encrypted encryption key being decryptable with a secret key of the second user.

20 Claims, 9 Drawing Sheets

(51) Int. Cl.
*G06F 3/06* (2006.01)
*H04L 9/30* (2006.01)
*G06F 16/174* (2019.01)

(52) U.S. Cl.
CPC .......... *G06F 3/0673* (2013.01); *G06F 16/174* (2019.01); *H04L 9/0825* (2013.01); *H04L 9/0894* (2013.01); *H04L 9/30* (2013.01); *H04L 9/3247* (2013.01); *H04L 2209/76* (2013.01)

(58) Field of Classification Search
CPC .... G06F 3/0673; G06F 3/0641; G06F 3/0608; H06F 17/3015
USPC ....................................................... 713/164
See application file for complete search history.

(56) References Cited

U.S. PATENT DOCUMENTS

| | | | |
|---|---|---|---|
| 2013/0166510 A1 | 6/2013 | Augenstein et al. | |
| 2013/0212388 A1 | 8/2013 | D'Souza et al. | |
| 2014/0025948 A1* | 1/2014 | Bestler | H04L 9/0863 713/167 |
| 2014/0189348 A1 | 7/2014 | El-Shimi et al. | |
| 2016/0301525 A1* | 10/2016 | Canard | H04L 9/0825 |

FOREIGN PATENT DOCUMENTS

| | | |
|---|---|---|
| CN | 103888249 A | 6/2014 |
| CN | 103957109 A | 7/2014 |

OTHER PUBLICATIONS

Li et al., "Secure Deduplication with Efficient and Reliable Convergent Key Management", IEEE Transactions on Parallel and Distributed Systems, vol. 25, No. 6, Jun. 2014, pp. 1615-1625.
Bellare et al., "DupLESS: Server Aided Encryption for Deduplicated Storage", Proceedings of the 22nd USENIX Security symposium, Aug. 14-16, 2013, pp. 1-16.
"Dropbox, a File-Storage and Sharing Service", Dropbox, Retrieved on May 30, 2017, Webpage available at : https://www.dropbox.com/?landing=dbv2.
"Google Drive", Google, Retrieved on May 30, 2017, Webpage available at : https://www.google.com/intl/en/drive/.
"Mozy, a File-Storage and Sharing Service", MOZY, Retrieved on May 30, 2017, Webpage available at : http://mozy.com/#slide-9.
Douceur et al., "Reclaiming Space from Duplicate Files in a Serverless Distributed File System", Proceedings 22nd International Conference on Distributed Computing Systems, 2002, 8 pages.
Wallace et al., "Characteristics of Backup Workloads in Production Systems", Proceedings of the 10th USENIX conference on File and Storage Technologies, Feb. 14-17, 2012, pp. 1-16.
"Convergent Encryption Reconsidered", cryptography, Retrieved on May 29, 2017, Webpage available at : http://www.mailarchive.com/cryptography@metzdowd.com/msg08949.html.
Liu et al., "A Policy-based Deduplication Mechanism for Encrypted Cloud Storage" Journal of Computational Information Systems, vol. 10, No. 6, 2014, pp. 2297-2304.
Jin et al., "Anonymous Deduplication of Encrypted Data with Proof of Ownership in Cloud Storage", IEEE/CIC International Conference on Communications in China, 2013, pp. 224-229.
Kaaniche et al., "A Secure Client Side Deduplication Scheme in Cloud Storage Environments", 6th International Conference on New Technologies, Mobility and Security, 2014, 7 pages.
International Search Report and Written Opinion received for corresponding Patent Cooperation Treaty Application No. PCT/CN2014/094189, dated Sep. 23, 2015, 12 pages.

* cited by examiner

DE-DUPLICATION OF ENCRYPTED DATA

RELATED APPLICATION

This application was originally filed as PCT Application No. PCT/CN2014/094189 filed Dec. 18, 2014.

FIELD OF INVENTION

The present invention relates to management of encrypted information.

BACKGROUND OF INVENTION

Data storage may be performed in a variety of different ways. Print media may be stored in archives printed on permanent, acid-free paper. The oldest extant books are several centuries old, however for storing dynamically created data paper storage may be inconvenient since updating and retrieval are slower than optimal. Remote access to paper-based archives may be inconvenient as documents may have to be provided in the mail, or using courier services, for example.

Electronic data storage has benefits and drawbacks compared to paper archiving. Electronic data storage enables quick storage and retrieval of large quantities of information, and enables handling of audio and video data as well as textual data. On the other hand, electronic media are inferior to paper in permanence, since the durability of electronically stored data is not at the same level as paper, which is capable of storing information for centuries, provided it is stored correctly. Electronic media, like digital media such as, for example, digital audio, video, photo, documents, are susceptible to fire and accidents.

Cloud storage is a form of electronic storage that overcomes media unreliability, since a cloud storage provider, CSP, may arrange the cloud storage to have regular backups and data redundancy to protect against random accidents, such as fire, and demagnetization of media that occurs over time.

Some consumer devices are configured to enable cloud storage of data created dynamically with the consumer devices. For example, a digital camera may enable storing images in a cloud storage service, so the images are accessible to the user and secure against loss or theft of the camera itself.

SUMMARY OF THE INVENTION

The invention is defined by the features of the independent claims. Some specific embodiments are defined in the dependent claims.

According to a first aspect of the invention, there is provided an apparatus comprising at least one processing core and at least one memory including computer program code, the at least one memory and the computer program code being configured to, with the at least one processing core, cause the apparatus at least to receive, from a first user, a ciphertext, a first hash value and a first ciphered encryption key, receive, from a second user, a second hash value, responsive to a determination the first hash value is the same as the second hash value, obtain a re-encryption key, and apply the re-encryption key to the first ciphered encryption key to obtain a re-encrypted encryption key, the re-encrypted encryption key being decryptable with a secret key of the second user.

Some embodiments of the first aspect comprise at least one feature from the following bulleted list:

- the apparatus is configured to obtain the re-encryption key by transmitting a request to a second apparatus, the request comprising at least one of a public key of the second user and an identity of the second user, and receiving from the second apparatus the re-encryption key
- the apparatus is configured to check whether the apparatus has the re-encryption key, and responsive to the check indicating the apparatus has the re-encryption key, the apparatus is configured to obtain it by fetching it from a memory
- the apparatus is further configured to receive, from the second user, at least one of a second ciphertext, a second ciphered encryption key, a cryptographic signature of the second hash value, and a second public key of the second user
- the apparatus is configured to receive, from the first user, at least one of a cryptographic signature of the first hash value, a public key of the first user and a second public key of the first user
- the apparatus is configured to receive at least one of the public key of the first user, the public key of the second user, the second public key of the first user and the second public key of the second user with a respective cryptographic certificate
- the apparatus is configured to verify at least one cryptographic certificate of at least one received public key
- the apparatus is further configured to provide the re-encrypted encryption key to the second user, to enable the second user to decrypt the ciphertext
- the apparatus is further configured to receive, from the second user, an instruction to delete a ciphertext corresponding to the second hash value, and to responsively block access to the second user to the ciphertext
- the apparatus is further configured to receive, after blocking access to the second user to the ciphertext, from the first user, an instruction to delete the ciphertext, and to responsively delete the ciphertext, for example if the first user is the last user of the ciphertext
- the apparatus is further configured to receive, from the first user, an updated ciphertext and an updated ciphered encryption key, to apply the re-encryption key to the updated ciphered encryption key to obtain an updated re-encrypted encryption key, the updated re-encrypted encryption key being decryptable with the secret key of the second user.

According to a second aspect of the invention, there is provided an apparatus comprising at least one processing core and at least one memory including computer program code, the at least one memory and the computer program code being configured to, with the at least one processing core, cause the apparatus at least to receive, from a first user, a ciphertext, a first hash value and a first ciphered encryption key, receive, from a second user, a second hash value and a second ciphered encryption key, responsive to a determination that the first hash value is the same as the second hash value and that the second user is an owner of the ciphertext, obtain a re-encryption key, and apply the re-encryption key to the second ciphered encryption key to obtain a re-encrypted encryption key, the re-encrypted encryption key being decryptable with a secret key of the first user.

According to a third aspect of the invention, there is provided a method comprising receiving, in an apparatus, from a first user, a ciphertext, a first hash value and a first ciphered encryption key, receiving, from a second user, a second hash value, responsive to a determination the first hash value is the same as the second hash value, obtaining a re-encryption key, and applying the re-encryption key to the first ciphered encryption key to obtain a re-encrypted encryption key, the re-encrypted encryption key being decryptable with a secret key of the second user.

Some embodiments of the third aspect comprise at least one feature corresponding to a feature from the preceding bulleted list laid out in connection with the first aspect.

According to a fourth aspect of the invention, there is provided a method, comprising receiving, from a first user, a ciphertext, a first hash value and a first ciphered encryption key, receiving, from a second user, a second hash value and a second ciphered encryption key, responsive to a determination that the first hash value is the same as the second hash value and that the second user is an owner of the ciphertext, obtaining a re-encryption key, and applying the re-encryption key to the second ciphered encryption key to obtain a re-encrypted encryption key, the re-encrypted encryption key being decryptable with a secret key of the first user.

According to a fifth aspect of the invention, there is provided an apparatus comprising at least one processing core and at least one memory including computer program code, the at least one memory and the computer program code being configured to, with the at least one processing core, cause the apparatus at least to obtain, from a plaintext, using a first key, a ciphertext, transmit to a server the ciphertext, a hash value derived from the plaintext and the first key, the first key being encrypted with a public key of a second server, receive, from the server, a re-encrypted key, decrypt the re-encrypted key to obtain a second key, and decrypt, using the second key, a second ciphertext received from the server, thereby obtaining the plaintext An apparatus according to the fifth aspect may be configured to transmit the hash value in a cryptographically signed form. An apparatus according to the fifth aspect may be configured to decrypt the re-encrypted key using a secret key of the apparatus.

According to a sixth aspect of the invention, there is provided a method, comprising obtaining, from a plaintext, using a first key, a ciphertext, transmitting to a server the ciphertext, a hash value derived from the plaintext and the first key, the first key being encrypted with a public key of a second server, receiving, from the server, a re-encrypted key, decrypting the re-encrypted key to obtain a second key, and decrypting, using the second key, a second ciphertext received from the server, thereby obtaining the plaintext.

According to a seventh aspect of the invention, there is provided an apparatus, comprising means for receiving, in an apparatus, from a first user, a ciphertext, a first hash value and a first ciphered encryption key, means for receiving, from a second user, a second hash value, means for obtaining a re-encryption key responsive to a determination the first hash value is the same as the second hash value, and means for applying the re-encryption key to the first ciphered encryption key to obtain a re-encrypted encryption key, the re-encrypted encryption key being decryptable with a secret key of the second user.

According to an eighth aspect of the invention, there is provided an apparatus comprising means for receiving, from a first user, a ciphertext, a first hash value and a first ciphered encryption key, means for receiving, from a second user, a second hash value and a second ciphered encryption key, means for obtaining a re-encryption key responsive to a determination that the first hash value is the same as the second hash value and that the second user is an owner of the ciphertext, and means for applying the re-encryption key to the second ciphered encryption key to obtain a re-encrypted encryption key, the re-encrypted encryption key being decryptable with a secret key of the first user.

According to a ninth aspect of the invention, there is provided a non-transitory computer readable medium having stored thereon a set of computer readable instructions that, when executed by at least one processor, cause an apparatus to at least receive, in an apparatus, from a first user, a ciphertext, a first hash value and a first ciphered encryption key, receive, from a second user, a second hash value, responsive to a determination the first hash value is the same as the second hash value, obtain a re-encryption key, and apply the re-encryption key to the first ciphered encryption key to obtain a re-encrypted encryption key, the re-encrypted encryption key being decryptable with a secret key of the second user.

According to a tenth aspect of the invention, there is provided a non-transitory computer readable medium having stored thereon a set of computer readable instructions that, when executed by at least one processor, cause an apparatus to at least receive, from a first user, a ciphertext, a first hash value and a first ciphered encryption key, receive, from a second user, a second hash value and a second ciphered encryption key, responsive to a determination that the first hash value is the same as the second hash value and that the second user is an owner of the ciphertext, obtain a re-encryption key, and apply the re-encryption key to the second ciphered encryption key to obtain a re-encrypted encryption key, the re-encrypted encryption key being decryptable with a secret key of the first user.

According to an eleventh aspect of the present invention, there is provided an apparatus comprising at least one processing core and at least one memory including computer program code, the at least one memory and the computer program code being configured to, with the at least one processing core, cause the apparatus at least to obtain, from a plaintext, using a first key, a ciphertext, transmit to a server the ciphertext, a hash value derived from the plaintext and the encrypted first key with a public key of a second server, receive, from a second server, a re-encryption key, re-encrypt the encrypted first key using the re-encryption key, decrypt the re-encrypted first key to obtain the first key, and decrypt, using the first key, the ciphertext received from the server, thereby obtaining the plaintext.

According to a twelfth aspect of the invention, there is provided a computer program configured to cause a method according to the third, fourth or sixth aspect to be performed.

INDUSTRIAL APPLICABILITY

At least some embodiments of the present invention find industrial application in managing encrypted information, for example to conserve storage capacity of a data storage system.

DETAILED DESCRIPTION OF EXAMPLE EMBODIMENTS

A storage provider may determine, based on hashes of plaintexts, whether two encrypted data items are derived from the same plaintext. In case this is the case, a re-encryption key may be obtained and used to re-encrypt a ciphered encryption key provided in connection with a first one of the two encrypted data items, to enable the user providing the other one of the two encrypted data items to decrypt the first one of the two encrypted data items. Thus only the first one of the two encrypted data items need be stored in the storage.

Figure 1:
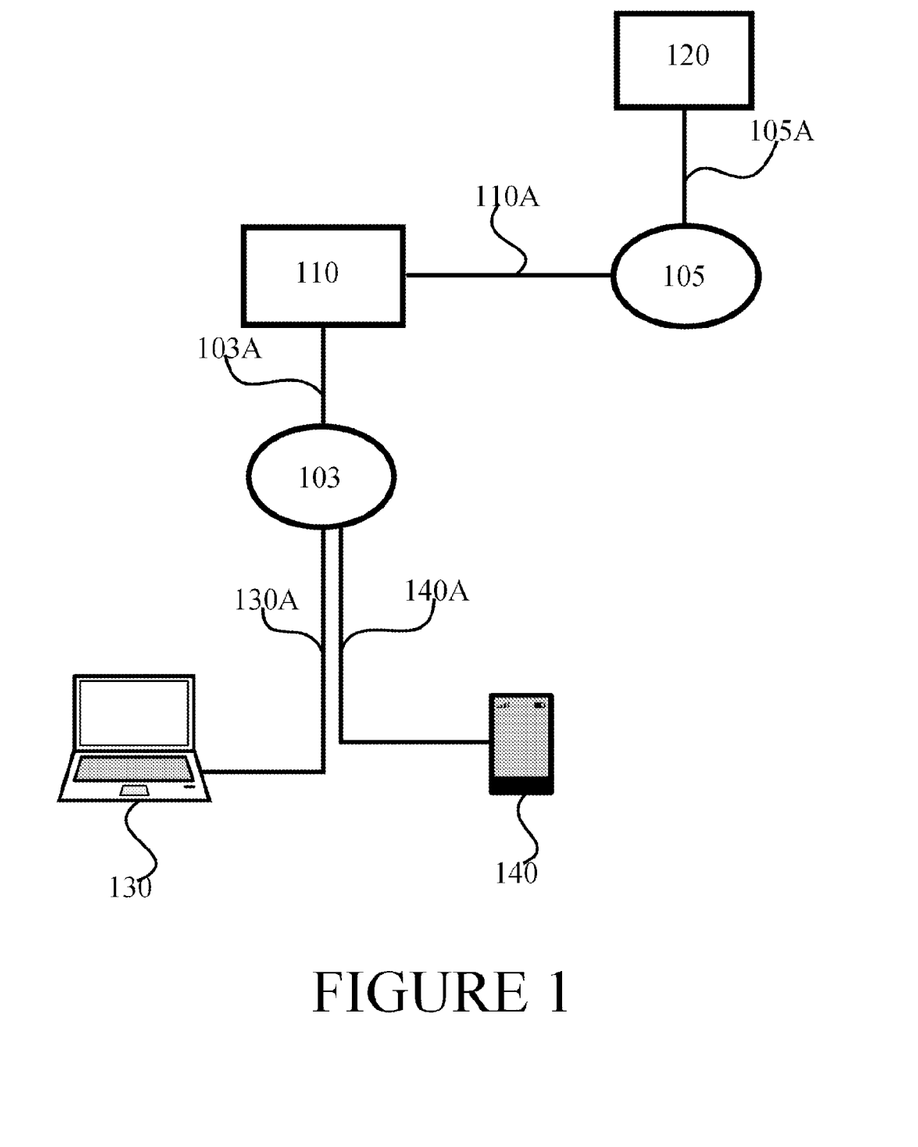
FIG. 1 illustrates an example system capable of supporting at least some embodiments of the present invention.

FIG. 1 illustrates an example system capable of supporting at least some embodiments of the present invention. The system of FIG. 1 comprises CSP 110, which is arranged to provide remote storage service to at least one user. In some embodiments, CSP 110 is arranged to provide storage to a plurality of users. CSP 110 may store data provided by users in a mass memory arrangement available to CSP 110. Such a mass memory arrangement may comprise, for example, a scalable redundant array of independent disks, RAID, magnetic media arrangement. CSP 110 may comprise a control device arranged to control the mass memory arrangement, or CSP 110 may comprise the control device and the mass memory arrangement.

User 130 and user 140 may communicate with CSP 110 via network 103. Network 103 may comprise at least one network, such as, for example, the Internet or at least one corporate or Internet service provider, ISP, network. CSP 110 is arranged to communicate with network 103 via connection 103A, which may comprise a wire-line connection, such as an Ethernet connection or an optical fibre, for example. User 130 is enabled to communicate with network 103 via connection 130A, which may comprise, for example, a wire-line connection or an at least in part wireless connection. User 140 is enabled to communicate with network 103 via connection 140A, which may comprise, for example, a wire-line connection or an at least in part wireless connection. User 130 and user 140 are represented in FIG. 1 by their respective devices. User devices compatible with the present invention include computers, such as desktop, laptop, tablet or wearable computers, cellular phones such as smartphones or phablets, and other suitable devices with communication capability.

CSP 110 is arranged to communicate, via connection 110A, with network 105. Connection 110A may comprise a connection of similar type to connection 103A, for example. Network 105 may comprise network 103 and/or a different network or networks. Authorized Party, AP, 120 may comprise a trusted party, for example a party trusted by user 130 and 140. AP 120 may be trusted by the users. AP 120 may be distinct from, and independent of, CSP 110 although in some embodiments, the functionality of AP 120 may be integrated in CSP 110.

User 130 and user 140 may provide data to CSP 110 for storage. For example user 140 may capture digital photographs with a camera comprised in his device and provide them to CSP 110 for storage. User 130 may download data from the Internet and provide it to CSP 110 for storage. Privacy considerations favour employing encryption to data before providing the data to CSP 110. For example, user 140 may choose to encrypt her photographs before providing them over connection 140A, since a malicious party with access to at least one of connection 140A, network 103, connection 103A and CSP 110 could otherwise inspect the photographs. Likewise user 130 may choose to encrypt his data before providing it to CSP 110. The encryption keys may be held by the users themselves, to use when retrieving the data information from CSP 110. For example, to access her photographs at a later time, user 140 may request the encrypted files from CSP 110, and once in possession of the encrypted data she can reverse the encryption process, using her key, to obtain the original photographs. Some data storage systems attempt to perform removal of duplicate information, which may be referred to as deduplication. In real practice, allowing the user to manage deduplication could be hard due to some reasons: 1) The user may not be always online or available for such a management, which could cause a big storage delay; 2) Although involving the user for deduplication could help digital rights management and access control, the designed system could be complicated in terms of communications and computations; 3) In some cases, the user has no idea how to issue access rights or deduplication keys to a user (the user of the same data) whom he doesn't know (due to his data's super-distribution). This fact could influence the business of CSP. So there is a case that CSP doesn't want to cooperate with the user on data storage deduplication. In general encrypted data may be referred to as ciphertext, while unencrypted data may be referred to as plaintext. The operation of encryption therefore obtains a ciphertext from a plaintext, and the operation of decryption obtains a plaintext from a ciphertext.

The storage capacity of CSP 110 may be very large, for example, measured in terabytes, petabytes or exabytes, but nonetheless the storage capacity is a limited resource. CSP 110 may conserve its storage space by identifying duplicate data provided to CSP 110 for storage, and for each duplicated data store only one copy. If two users provide the same file, CSP 110 may store one copy and provide links to the data from accounts of both users. This procedure may be referred to as deduplication, which in general refers to a process where a single copy of a data item is stored when the same data is provided to storage more than once. Access to the data item may be arranged to one or more users by providing suitable pointers and/or keys. From the point of view of the users, the arrangement appears identical to the case where CSP 110 would store a separate copy of the data item for both users. A duplicated data item may occur, for example, when user 130 and user 140 both obtain from the Internet the same data item, and subsequently send it to CSP 110 for storage.

If users encrypt their data, identifying duplicated data becomes more difficult for CSP 110. As user 130 and user 140 use, in general, different encryption keys, an identical initial plaintext is converted in the encrypting processes to different ciphertexts. When user 130 and user 140 subsequently provide the ciphertexts to CSP 110 for storage, the CSP 110 may not realize the underlying data is the same since the ciphertexts are different and CSP 110 lacks the encryption keys. Moreover, as the plaintext is recoverable from the two ciphertexts with different keys, storing only one copy of the ciphertext would endanger the access of one of the users to the plaintext.

One method to enable storing only one copy of the ciphertext is to encrypt the plaintext, by user 130 and user 140, independently of each other, with the same key. For example, a cryptographic hash of the plaintext may be used as the key. Since the used key and the plaintext are the same, the ciphertext resulting from the encryption process is the same, which CSP 110 may detect and perform deduplication as described above. A drawback of using a key determined by the data of the plaintext is that it enables dictionary-based attacks.

Another method to enable storing only one copy of the ciphertext is to employ a key server separate from a CSP, the key server being configured to generate keys based on the plaintext data. A drawback of this method is using a separate key server.

In the system of FIG. 1, users 130 and 140 may store data on CSP 110 in encrypted form, and a re-encryption scheme is used to perform deduplication as described herein. Initially user 130 encrypts the data plaintext, using an encryption algorithm and key DEK, which may be randomly generated, to obtain a ciphertext. This ciphertext is referred to herein as user_130_ciphertext. User 140, likewise, obtains a ciphertext, referred to hereinafter as user_140_ciphertext, by encrypting the same plaintext using a different key. User_130_ciphertext and user_140_ciphertext are not identical, since despite being derived from the same plaintext, different encryption keys are used.

User 130 then provides the user_130_ciphertext to CSP 110 for storage. User 130 also provides a hash of the plaintext, and DEK encrypted with a public encryption key of AP 120. A public encryption key may be referred to as a public key for short, likewise a secret encryption key may be referred to as a secret key. In a public key-secret key pair, a public key may be used for encryption but not decryption, while data encrypted with the public key may be decrypted with the corresponding secret key. In general public keys may be obtained, for example, from a public key repository that provides public keys on request. Since there is no need to keep public keys confidential, and in fact making public keys easily accessible may be preferable.

To improve security, the hashes provided to CSP 110 by user 130 and/or user 140 may be signed with the secret keys of user 130 and/or user 140, respectively. Public keys of user 130 and/or user 140 may be provided to CSP 110 in certified form, such that the public keys are comprised in a message with a cryptographic certificate that CSP 110 is enabled to verify, to ensure the public keys are those of user 130 and/or user 140, respectively.

User 140 then provides the user_140_ciphertext to CSP 110 for storage. User 140 also provides a hash of the plaintext, and the key that user 140 used in encrypting the plaintext, this key in turn being encrypted with the public encryption key of AP 120. User 130 and/or user 140 may obtain the public key of AP 120 by requesting it from AP 120, or from a public key repository, for example.

Since the hashes provided to CSP 110 by user 130 and user 140 are based on the same plaintext, the hashes are identical, enabling CSP 110 to determine that user_130_ciphertext and user_140_ciphertext are encrypted versions of the same data. CSP 110 then deduplicates the data by obtaining a re-encryption key. The re-encryption key may be obtained, for example, by transmitting to AP 120 a request for a re-encryption key. CSP 110 may provide to AP 120, in the request, at least one of an identity of user 140 and a public key of user 140. AP 120 may, optionally, perform a check as to whether deduplication is appropriate in this instance. AP may obtain a re-encryption key based on the public key of user 140, the secret key of AP 120 and the public key of AP 120 applied to a re-encryption key generation algorithm, for example internally in AP 120. An example of a re-encryption key generation algorithm is a proxy re-encryption key generation algorithm. AP 120 may provide the re-encryption key to CSP 110, for example via network 105, connection 105A and connection 110A.

Once on possession of the re-encryption key, CSP 110 may discard user_140_ciphertext and apply the re-encryption key to the copy of DEK that CSP 110 has, to obtain a copy of key DEK that is decryptable with a secret key of user 140. In other words, the re-encryption process obtains from a copy of DEK decryptable with a secret key of AP 120 to a copy of DEK decryptable with the secret key of user 140. The re-encrypted key DEK may be provided to user 140, to use when accessing the ciphertext. The ciphertext that CSP 110 provides to user 140 when user 140 later requests it is user_130_ciphertext, which user 140 can decrypt to obtain the plaintext by using the re-encrypted key DEK.

In the deduplication process described above, AP 120 doesn't see the ciphertext, and CSP 110 doesn't see any unencrypted version of key DEK. Therefore, the only entities to have access to the plaintext are user 130 and user 140.

User 130 may provide to CSP 110 a second public key of user 130, which may also be certified with a cryptographic certificate. Likewise, user 140 may provide to CSP 110 a second public key of user 140, which likewise may be certified with a cryptographic certificate. The second public key may be used in verifying signatures, such as for example signatures applied to hash values, in embodiments where more than one public key cryptography key pair is used for each user. In these embodiments, one pair of keys may be used for re-encryption purposes and the second pair for messaging and/or any other uses than re-encryption, for example.

When a deduplicated data item is deleted by a user from CSP 110, CSP 110 will delete the stored data item when all users that have access to the data item have deleted it. In case one user deletes the data item but another user, who has access to the same data item, does not delete it, CSP 110 simply no longer indicates the data item as available to the user who deleted it from his account.

Figure 2:
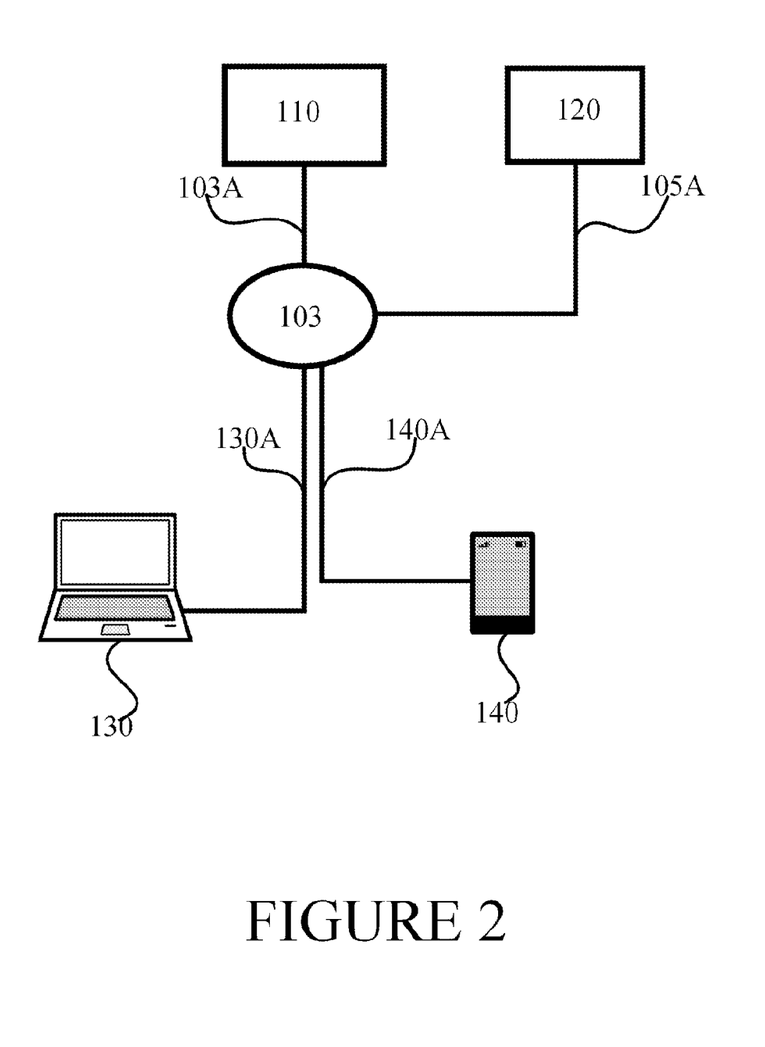
FIG. 2 illustrates an example use case in accordance with at least some embodiments of the present invention.

FIG. 2 illustrates an example system case in accordance with at least some embodiments of the present invention. The system of FIG. 2 resembles that of FIG. 1, and like numbering denotes like structure as in FIG. 1. In the system of FIG. 2, there is no separate network between CSP 110 and AP 120, rather CSP 110, AP 120, user 130 and user 140 all communicate via network 103. Network 103 may comprise the Internet, for example. In general, communication between CSP 110 and AP 120, whether in the system of FIG. 1, FIG. 2 or in another embodiment, may be encrypted, for example using transport layer security, TLS. TLS or another cryptoprotocol may be employed also in communication between CSP 110 and users, in addition to communicating ciphertexts, so that header and other data is encrypted in addition to the actual data items.

Figure 3:
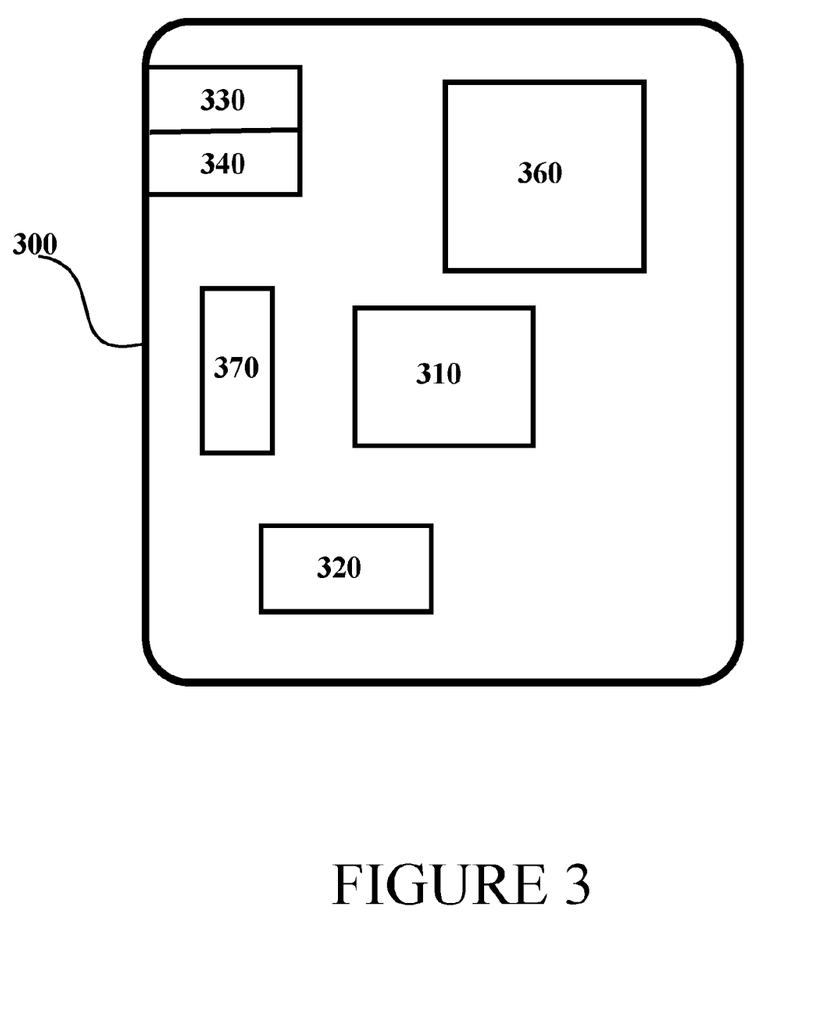
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a CSP 110, user 130 or user 140 of FIG. 1 or FIG. 2. Device 300 may comprise a desktop server device, a laptop computer or, for example, a mobile device such as a tablet computer arranged to perform the role of a CSP 110. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by ARM Holdings or a Brisbane processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310.

Device 300 may comprise a transmitter 330. Device 300 may comprise a receiver 340. Transmitter 330 and receiver 340 may be configured to transmit and receive, respectively, information in accordance with at least one cellular or non-cellular radio communication standard. Transmitter 330 may comprise more than one transmitter. Receiver 340 may comprise more than one receiver. Transmitter 330 and/or receiver 340 may be configured to operate in accordance with Ethernet and/or other networking technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept configure data storage quotas and manage a user database.

Device 300 may comprise or be arranged to control a mass memory module 370. Mass memory module 370 may comprise, for example, an array of magnetic disks arranged to store customer data, or a module or interface configured to control such an array of magnetic disks.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Processor 310, memory 320, transmitter 330, receiver 340, NFC transceiver 350, UI 360 and/or mass memory module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
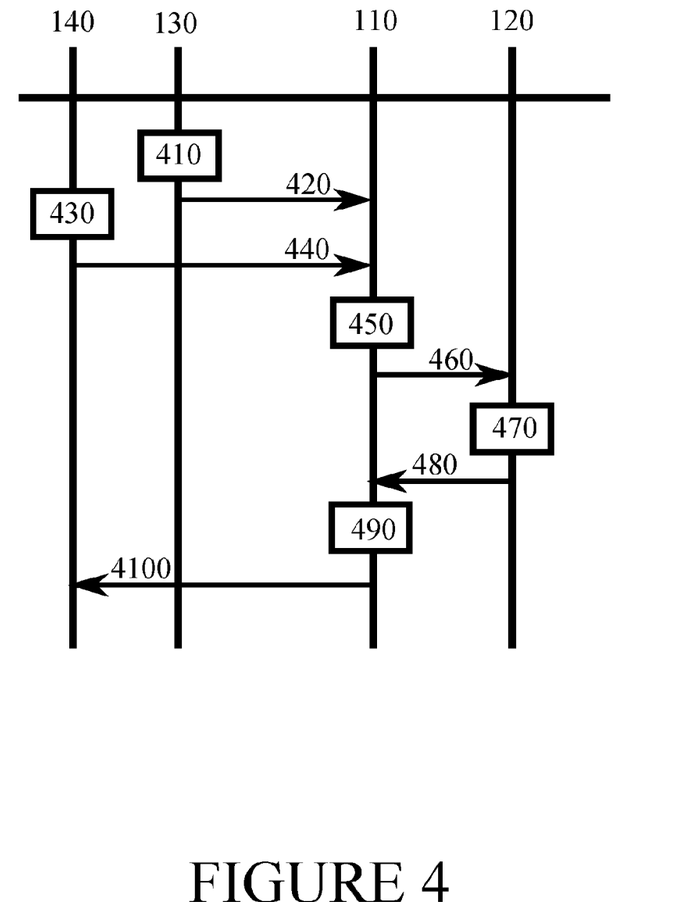
FIG. 4 illustrates signalling in accordance with at least some embodiments of the present invention.

FIG. 4 illustrates signalling in accordance with at least some embodiments of the present invention. On the vertical axes are disposed, from left to right, user 140, user 130, CSP 110, and finally AP 120. These entities have been described above in connection with FIG. 1.

In phase 410, user 130 encrypts a plaintext to obtain user_130_ciphertext, using a key DEK randomly or pseudo randomly generated by user 130, for example. In phase 420, user 130 provides to CSP 110 for storage at least the following: user_130_ciphertext, DEK encrypted with the public key of AP 120, and a cryptographic hash of the plaintext. The cryptographic hash may be signed by user 130, using a secret key of user 130.

In phase 430, user 140 encrypts the same plaintext to obtain user_140_ciphertext, using a key randomly or pseudo randomly generated by user 140, for example. In phase 440, user 140 provides to CSP 110 for storage at least the following: user_140_ciphertext, the key used to encrypt the plaintext to obtain user_140_ciphertext, encrypted with the public key of AP 120, and a cryptographic hash of the plaintext. The cryptographic hash may be signed by user 140, using a secret key of user 140.

In phase 450 CSP 110 determines, based on a comparison of the hashes received in phases 420 and 440, that the plaintext underlying user_130_ciphertext and user_140_ciphertext is the same. In detail, the sameness of the plaintext determines the sameness of the hashes, and determining the hashes are the same allows determining the plaintexts are the same.

In phase 460, CSP 110 requests from AP 120 a re-encryption key. The request of phase 460 may comprise at least one of an identity of user 140 and a public key of user 140. CSP 110 may have received a public key of user 140, for example, in phase 440. In phase 470, AP 120 may, optionally, verify that deduplication is appropriate, for example, deduplication may be disabled for data involving high-priority users. In phase 470 AP 120 derives the requested re-encryption key. In detail, AP 120 may run a re-encryption key derivation algorithm, which may take as inputs, for example, the public key of user 140 and the public and secret keys of AP 120. In case AP 120 is provided with an identity of user 140 but not the public key of user 140, AP 120 may retrieve the public key of user 140 from a public key repository using the identity.

In phase 480, AP 120 provides to CSP 110 the re-encryption key, enabling CSP 110 to, in phase 490, derive a re-encrypted encryption key from DEK encrypted with the public key of AP 120. In phase 4100, CSP 110 provides the re-encrypted encryption key to user 140. User 140 may then decrypt the re-encrypted encryption key to obtain key DEK, which is capable of reversing the encryption of user_130_ciphertext to thereby recover the plaintext. Thus, CSP 110 is enabled, by discarding user_140_ciphertext, to store only one copy of the ciphertext, and the data is successfully deduplicated. In general, where CSP 110 already has the re-encryption key of a user, for example from a prior re-encryption procedure, CSP 110 need not request the re-encryption key separately from AP 120. In this regard, in general obtaining the re-encryption key may comprise either requesting and receiving the re-encryption key from AP 120, or retrieving the re-encryption key from a memory internal to, or under the control of, CSP 110.

Figure 5:
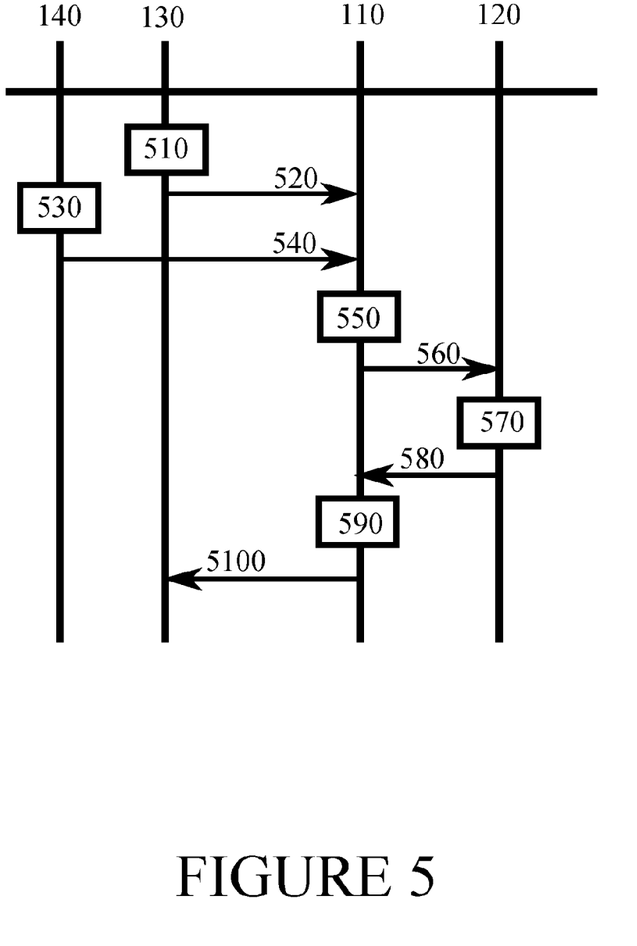
FIG. 5 illustrates signalling in accordance with at least some embodiments of the present invention.

FIG. 5 illustrates signalling in accordance with at least some embodiments of the present invention. The signalling in FIG. 5 resembles the signalling of FIG. 4, except that in FIG. 5, CSP 110 determines that user 140 is the owner of the plaintext, rather than user 130.

In phase 510, user 130 encrypts a plaintext to obtain user_130_ciphertext, using a key DEK randomly or pseudo randomly generated by user 130. In phase 520, user 130 provides to CSP 110 for storage at least the following: user_130_ciphertext, DEK encrypted with a public key of AP 120, and a cryptographic hash of the plaintext. The cryptographic hash may be signed by user 130, using a secret key of user 130.

In phase 530, user 140 encrypts the plaintext to obtain user_140_ciphertext, using a key randomly or pseudo randomly generated by user 140. In phase 540, user 140 provides to CSP 110 for storage at least the following: user_140_ciphertext, the key used to encrypt the plaintext to obtain user_140_ciphertext, encrypted with the public key of AP 120, and a cryptographic hash of the plaintext. The cryptographic hash may be signed by user 140, using a secret key of user 140.

In phase 550 CSP 110 determines, based on a comparison of the hashed received in phases 420 and 440, that the plaintext underlying user_130_ciphertext and user_140_ciphertext is the same. In detail, the sameness of the plaintext determines the sameness of the hashes. CSP 110 also determines that user 140 is the owner of the plaintext.

In phase 560, CSP 110 requests from AP 120 a re-encryption key. The request of phase 560 may comprise at least one of an identity of user 130 and a public key of user 130. CSP 110 may have received a public key of user 130, for example, in phase 520. In phase 570, AP 120 may, optionally, verify that deduplication is appropriate, for example, deduplication may be disabled for data involving high-priority users. In phase 570 AP 120 derives the requested re-encryption key. In detail, AP 120 may run a re-encryption key derivation algorithm, which may take as inputs, for example, the public key of user 130 and the public and secret keys of AP 120. In case AP 120 is provided with an identity of user 130 but not the public key of user 130, AP 120 may retrieve the public key from a public key repository using the identity.

In phase 580, AP 120 provides to CSP 110 the re-encryption key, enabling CSP 110 to, in phase 590, derive a re-encrypted encryption key from the key provided by user 140 in phase 540. In phase 5100, CSP 110 provides the re-encrypted encryption key to user 130. User 130 may then decrypt the re-encrypted encryption key to obtain the key user 140 used when encrypting the plaintext to obtain user_140_ciphertext. Thus user 130 is enabled to reverse the encryption of user_140_ciphertext to thereby recover the plaintext. Thus, CSP 110 is enabled, by discarding user_130_ciphertext, to store only one copy of the ciphertext, and the data is successfully deduplicated. Also the encrypted key provided by user 130 may be discarded by CSP 110.

Figure 6:
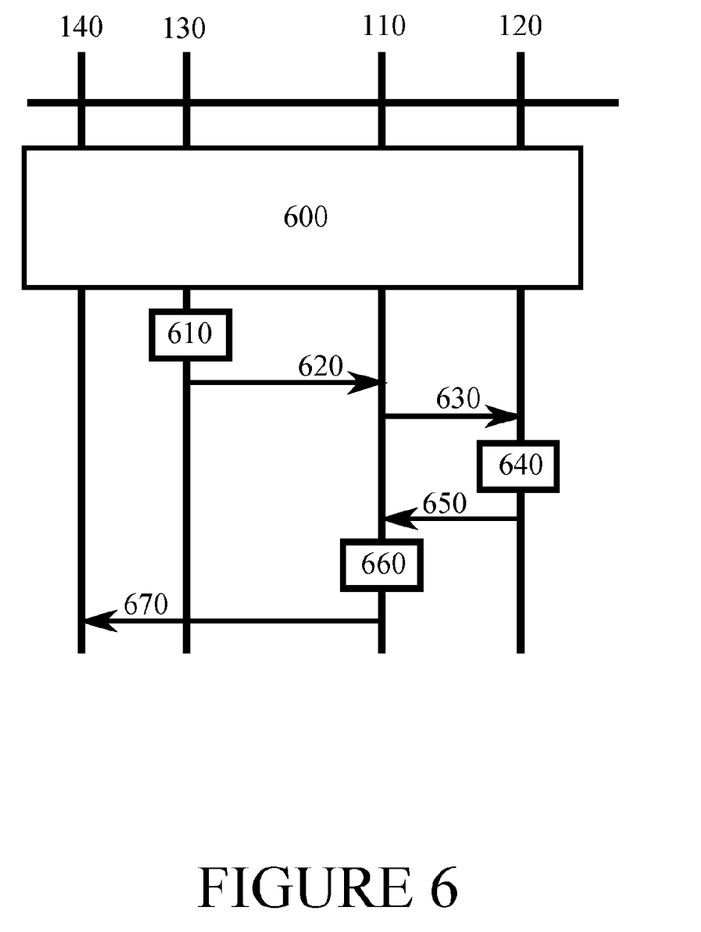
FIG. 6 illustrates signalling in accordance with at least some embodiments of the present invention.

FIG. 6 illustrates signalling in accordance with at least some embodiments of the present invention. The axes of FIG. 6 correspond to those of FIG. 4 and FIG. 5. Phase 600 of FIG. 6 corresponds to all phases illustrated in FIG. 4, with phase 610 taking place after phase 4100. The process of FIG. 6 corresponds to updating deduplicated data in CSP 110.

In phase 610, user 130 obtains an updated version of the plaintext. User 130 subsequently encrypts the updated plaintext with a new key DEK' to obtain user_130_ciphertext', and provides to CSP 110 the user_130_ciphertext', DEK' encrypted with the public key of AP 120, and, optionally, the public key of user 130 and a second public key of user 130.

In phase 630, CSP 110 requests a re-encryption key from AP 120, the request comprising at least one of a public key of user 140 and an identity of user 140. AP 120, in phase 640, derives the re-encryption key using the public key of user 140 and the public and secret keys of AP 120. In phase 650, AP 120 provides the re-encryption key to CSP 110. In general, where CSP 110 already has the re-encryption key of a user, for example from a prior re-encryption procedure, CSP 110 need not request the re-encryption key separately from AP 120. In this regard, in general obtaining the re-encryption key may comprise either requesting and receiving the re-encryption key from AP 120, or retrieving the re-encryption key from a memory internal to, or under the control of, CSP 110.

In phase 660, CSP 110 performs the re-encryption on the encrypted DEK' to obtain a re-encrypted encryption key which user 140 can decrypt. In phase 670, CSP 120 provides the re-encrypted encryption key to user 140. After phase 670, user 140 can use the secret key of user 140 to obtain key DEK', which is capable of reversing the encryption of user_130_ciphertext'.

CSP 110 may derive re-encrypted keys for each user that has access to the ciphertext, to maintain their access to the data after the updating.

Figure 7:
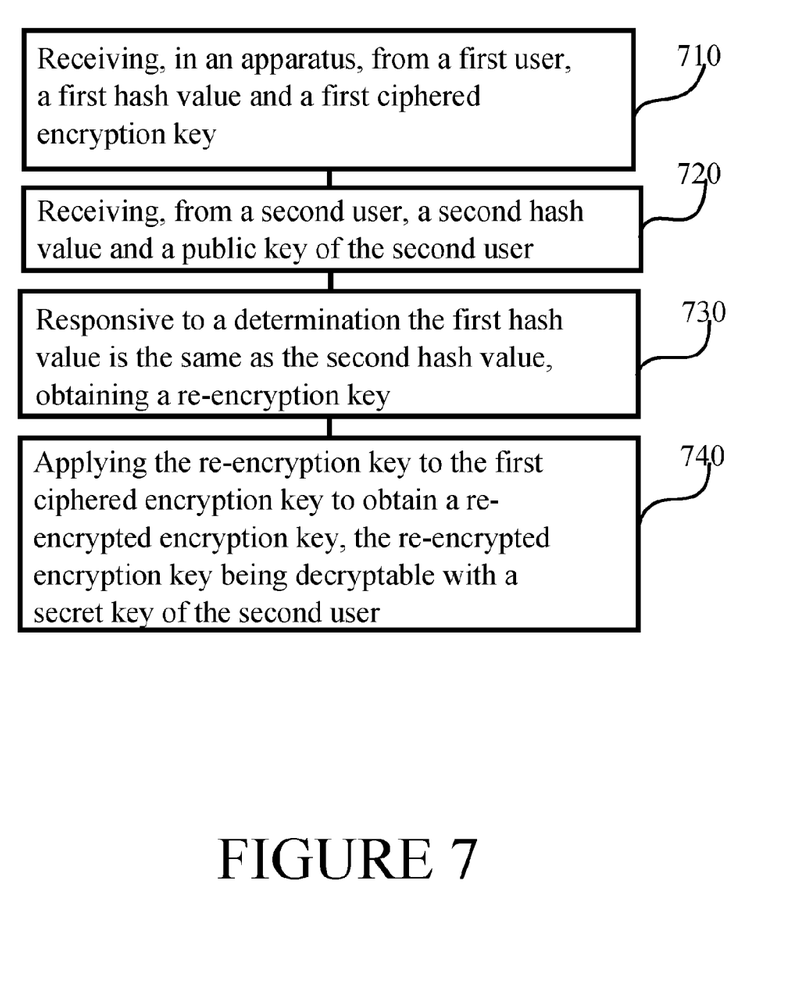
FIG. 7 is a first flow chart of a first method in accordance with at least some embodiments of the present invention.

FIG. 7 is a first flow chart of a first method in accordance with at least some embodiments of the present invention. The phases of the illustrated method may be performed in CSP 110, or in a control device configured to control functioning of CSP 110, for example. Phase 710 comprises receiving, in an apparatus, from a first user, a ciphertext, a first hash value and a first ciphered encryption key. Phase 720 comprises receiving, from a second user, a second hash value and, optionally, a public key of the second user. Phase 730 comprises, responsive to a determination the first hash value is the same as the second hash value, obtaining a re-encryption key. Finally, phase 740 comprises applying the re-encryption key to the first ciphered encryption key to obtain a re-encrypted encryption key, the re-encrypted encryption key being decryptable with a secret key of the second user. The hash values, which may comprise cryptographic hashes, may be cryptographically signed by the users, using their respective secret keys.

Figure 8:
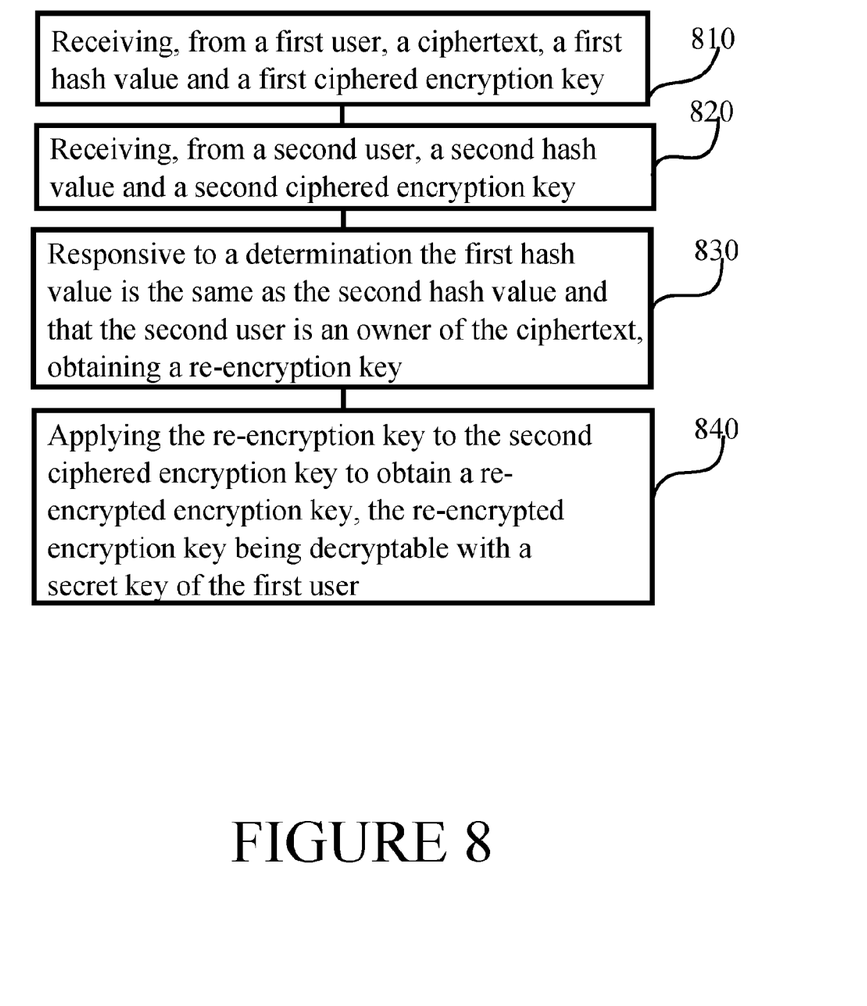
FIG. 8 is a second flow chart of a second method in accordance with at least some embodiments of the present invention.

FIG. 8 is a second flow chart of a second method in accordance with at least some embodiments of the present invention. The phases of the illustrated method may be performed in CSP 110, or in a control device configured to control functioning of CSP 110, for example. Phase 810 comprises receiving, from a first user, a ciphertext, a first hash value and a first ciphered encryption key. Phase 820 comprises receiving, from a second user, a second hash value and a second ciphered encryption key. Phase 830 comprises, responsive to a determination that the first hash value is the same as the second hash value and that the second user is an owner of the ciphertext, obtaining a re-encryption key. Finally, phase 840 comprises applying the re-encryption key to the second ciphered encryption key to obtain a re-encrypted encryption key, the re-encrypted encryption key being decryptable with a secret key of the first user. The hash values, which may comprise cryptographic hashes, may be cryptographically signed by the users, using their respective secret keys.

Figure 9:
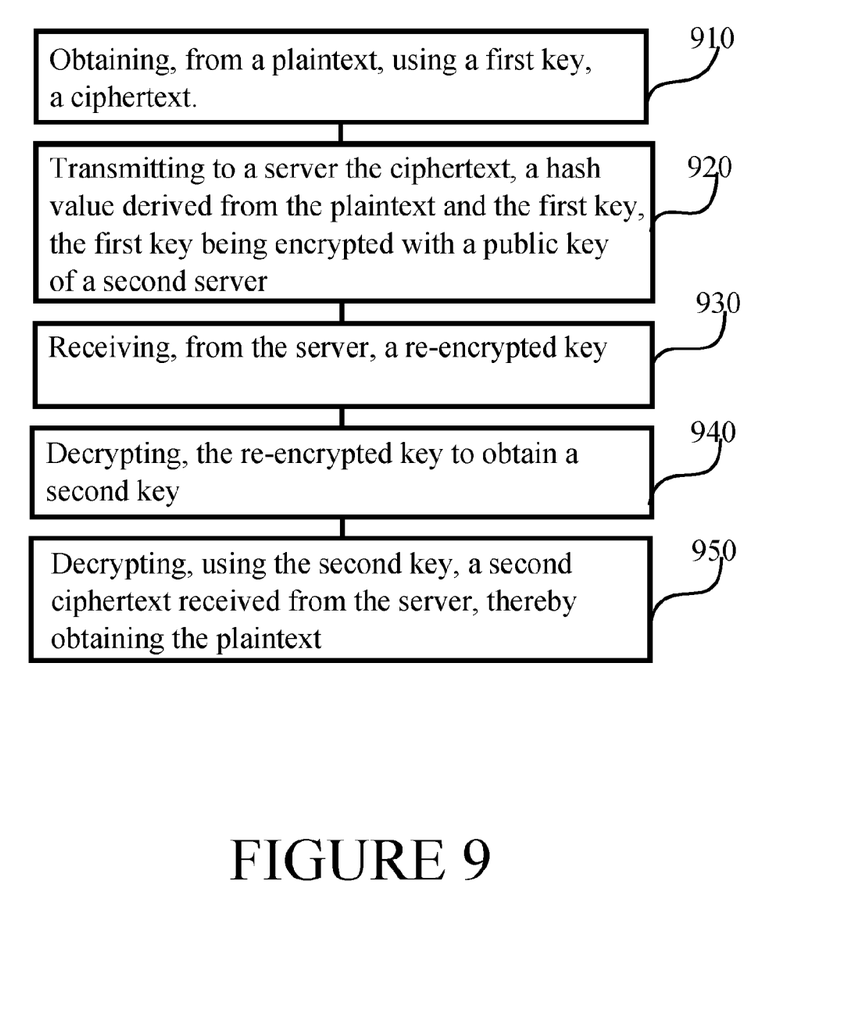
FIG. 9 is a second flow chart of a second method in accordance with at least some embodiments of the present invention.

FIG. 9 is a third flow chart of a third method in accordance with at least some embodiments of the present invention. The phases of the illustrated method may be performed in user device 140, user device 130, or in a control device configured to control functioning of thereof, for example.

Phase 910 comprises obtaining, from a plaintext, using a first key, a ciphertext. Phase 920 comprises transmitting to a server the ciphertext, a hash value derived from the plaintext and the first key, the first key being encrypted with a public key of a second server. In other words, the first key is transmitted in encrypted form. Phase 930 comprises receiving, from the server, a re-encrypted key. Phase 940 comprises decrypting the re-encrypted key to obtain a second key. Finally, phase 950 comprises decrypting, using the second key, a second ciphertext received from the server, thereby obtaining the plaintext. The hash value may comprise a cryptographic hash, which may be signed with a secret key.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising at least one processing core and at least one memory including computer program code, the at least one memory and the computer program code being configured to, with the at least one processing core, cause the apparatus at least to:
   receive, from a first user, a ciphertext, a first hash value and a first encrypted encryption key, the received first encryption key being encrypted using a public key of a second apparatus which is distinct from the apparatus, the apparatus not storing a key capable of decrypting the first encrypted encryption key;
   receive, from a second user, a second hash value;
   responsive to a determination the first hash value is the same as the second hash value, obtain a re-encryption key generated using a proxy re-encryption key generation algorithm, and
   apply the re-encryption key to the first encrypted encryption key to obtain a re-encrypted encryption key, the re-encrypted encryption key being decryptable with a secret key of the second user, wherein in obtaining the re-encrypted encryption key from the received encrypted key, the apparatus does not decrypt the first encrypted encryption key.

2. The apparatus according to claim 1 wherein the apparatus is configured to obtain the re-encryption key by transmitting a request to a second apparatus, the request comprising at least one of a public key of the second user and an identity of the second user, and receiving from the second apparatus the re-encryption key.

3. The apparatus according to claim 1, wherein the apparatus is configured to check whether the apparatus has the re-encryption key, and responsive to the check indicating the apparatus has the re-encryption key, the apparatus is configured to obtain it by fetching it from a memory.

4. The apparatus according to claim 1, wherein the apparatus is further configured to receive, from the second user, at least one of a second ciphertext, a second ciphered encryption key, a cryptographic signature of the second hash value, and a second public key of the second user.

5. The apparatus according to claim 1, wherein the apparatus is configured to receive, from the first user, at least one of a cryptographic signature of the first hash value, a public key of the first user and a second public key of the first user.

6. The apparatus according to claim 1, configured to receive at least one of the public key of the first user, the public key of the second user, the second public key of the first user and the second public key of the second user with a respective cryptographic certificate.

7. The apparatus according to claim 6, wherein the apparatus is configured to verify at least one cryptographic certificate of at least one received public key.

8. The apparatus according to claim 1, further configured to provide the re-encrypted encryption key to the second user, to enable the second user to decrypt the ciphertext.

9. The apparatus according to claim 1, wherein the apparatus is further configured to receive, from the second user, an instruction to delete a ciphertext corresponding to the second hash value, and to responsively block access to the second user to the ciphertext.

10. The apparatus according to claim 9, further configured to receive, after blocking access to the second user to the ciphertext, from the first user, an instruction to delete the ciphertext, and to responsively delete the ciphertext if the first user is the last user to save the ciphertext.

11. The apparatus according to claim 1, further configured to receive, from the first user, an updated ciphertext and an updated ciphered encryption key, to apply the re-encryption key to the updated ciphered encryption key to obtain an updated re-encrypted encryption key, the updated re-encrypted encryption key being decryptable with the secret key of the second user.

12. A method comprising:
receiving, in an apparatus, from a first user, a ciphertext, a first hash value and a first encrypted encryption key, the received first encryption key being encrypted using a public key of a second apparatus which is distinct from the apparatus, an apparatus performing the method not storing a key capable of decrypting the first encrypted encryption key;
receiving, from a second user, a second hash value;
responsive to a determination the first hash value is the same as the second hash value, obtaining a re-encryption key generated using a proxy re-encryption key generation algorithm, and
applying the re-encryption key to the first encrypted encryption key to obtain a re-encrypted encryption key, the re-encrypted encryption key being decryptable with a secret key of the second user, wherein in obtaining the re-encrypted encryption key from the received encrypted key, the apparatus does not decrypt the first encrypted encryption key.

13. The method according to claim 12, comprising obtaining the re-encryption key by transmitting a request to a second apparatus, the request comprising at least one of a public key of the second user and an identity of the second user, and receiving from the second apparatus the re-encryption key.

14. The method according to claim 12, further comprising checking whether the apparatus has the re-encryption key, and responsive to the check indicating the apparatus has the re-encryption key, obtaining it by fetching it from a memory.

15. The method according to claim 12, further comprising receiving, from the second user, at least one of a second ciphertext, a second ciphered encryption key, a cryptographic signature of the second hash value and a second public key of the second user.

16. The method according to claim 12, comprising receiving, from the first user, at least one of a cryptographic signature of the first hash value, a public key of the second user and a second public key of the first user.

17. The method according to claim 12, comprising receiving at least one of the public key of the first user, the public key of the second user, the second public key of the first user and the second public key of the second user with a respective cryptographic certificate.

18. The method according to claim 17, comprising verifying at least one cryptographic certificate of at least one received public key.

19. The method according to claim 12, further comprising providing the re-encrypted encryption key to the second user, to enable the second user to decrypt the ciphertext.

20. A non-transitory computer readable medium having stored thereon a set of computer readable instructions that, when executed by at least one processor, cause an apparatus to at least:
receive, in an apparatus, from a first user, a ciphertext, a first hash value and a first encrypted encryption key, the received first encryption key being encrypted using a public key of a second apparatus which is distinct from the apparatus, the apparatus not storing a key capable of decrypting the first encrypted encryption key;
receive, from a second user, a second hash value;
responsive to a determination the first hash value is the same as the second hash value, obtain a re-encryption key generated using a proxy re-encryption key generation algorithm, and
apply the re-encryption key to the first encrypted encryption key to obtain a re-encrypted encryption key, the re-encrypted encryption key being decryptable with a secret key of the second user, wherein in obtaining the re-encrypted encryption key from the received encrypted key, the apparatus does not decrypt the first encrypted encryption key.

\* \* \* \* \*